UNITED STATES PATENT OFFICE.

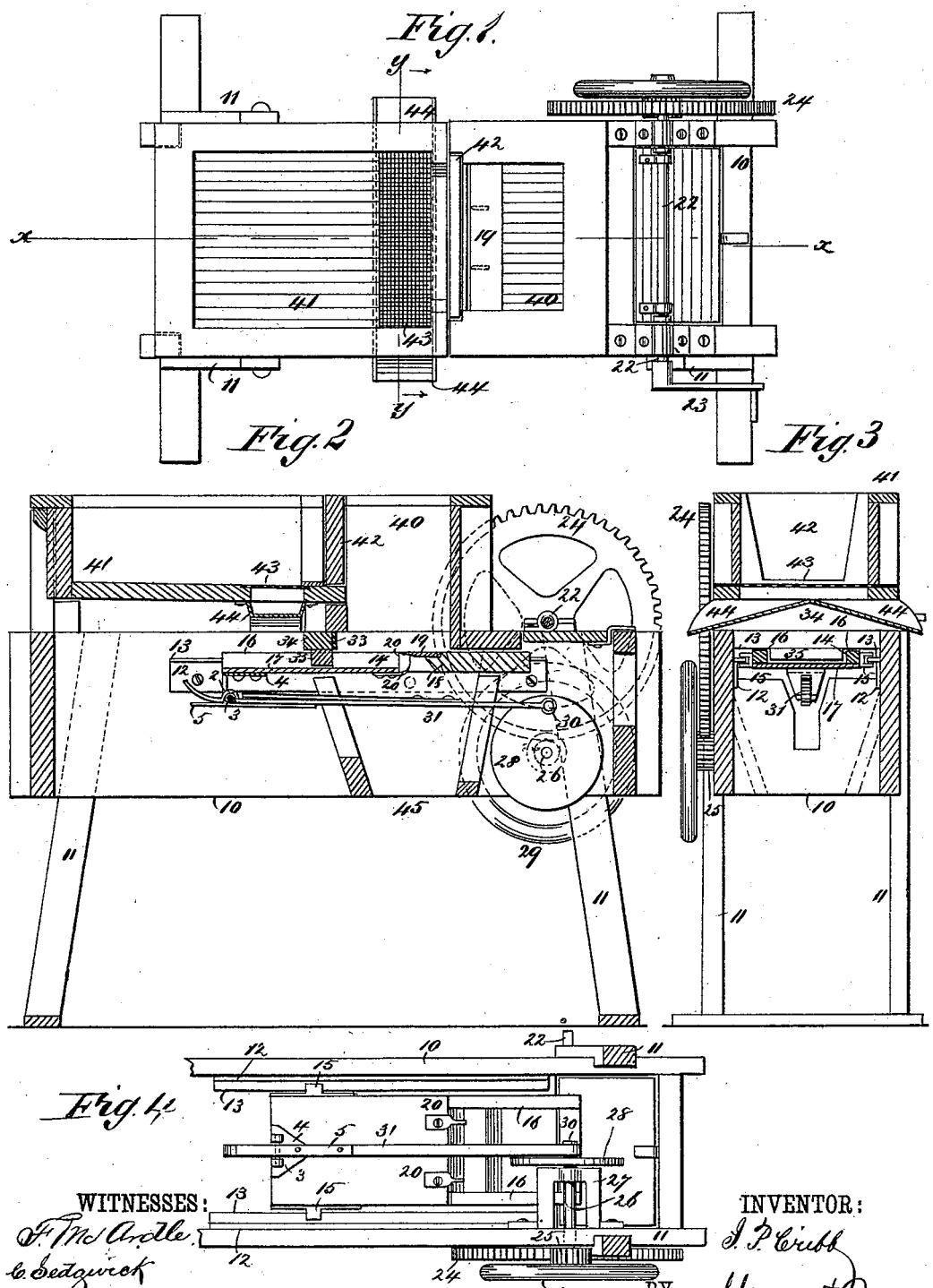

IRA P. CRIBB, OF CANANDAIGUA, NEW YORK.

VEGETABLE AND ROOT CUTTER.

SPECIFICATION forming part of Letters Patent No. 352,451, dated November 9, 1886.

Application filed June 15, 1886. Serial No. 205,287. (No model.)

*To all whom it may concern:*

Be it known that I, IRA P. CRIBB, of Canandaigua, in the county of Ontario and State of New York, have invented a new and Improved Vegetable and Root Cutter, of which the following is a full, clear, and exact description.

My invention relates to root or vegetable cutters wherein the parts are so arranged that the roots may be surely and rapidly cut without danger of the machine becoming clogged; and it consists of certain novel constructions and combinations hereinafter described, and specifically pointed out in the claims.

Reference is to be had to the accompanying drawings, forming a part of this specification, in which similar figures of reference indicate corresponding parts in all the figures.

Figure 1 is a plan view of my improved form of root-cutter. Fig. 2 is a longitudinal sectional view of the same, taken on line $x$ $x$ of Fig. 1. Fig. 3 is a cross-sectional view taken on line $y$ $y$ of Fig. 1; and Fig. 4 is an inverted plan view of a portion of the machine.

In constructing such a machine as the one illustrated in the drawings above referred to, I provide a main frame consisting of a bottomless trough, 10, that is mounted upon properly-arranged legs or standards 11. To the inner upper faces of the sides of the trough 10 I secure metallic plates 12, formed with inwardly-projecting flanges 13, which serve as ways or supports for a frame, 14, which is provided with outwardly-extending and centrally-slotted brackets 15, the flanges 13 fitting within the slots of the brackets 15. The frame 14 is made up of two side strips, 16, beneath one end of which there is secured a metallic plate, 17, which extends to a point beyond the center of the frame. At the other end of the frame there is arranged a block, 18, which carries a knife, 19, said knife extending from side to side of the frame. The plate 17 carries two small knives, 20, which extend upward and divide the space between the side strips of the frame into three about equal parts.

Near one end of the trough 10 there is mounted a transverse shaft, 22, which is provided with a crank-arm, 23, a large gear, 24, being secured to the other end of the shaft. This gear 24 engages with a pinion, 25, that is carried by a short shaft, 26, mounted beneath the shaft 22, the inner end of said shaft 26 being supported by a bracket, 27, that is secured to one of the side walls of the trough 10. The shaft 26 carries a disk, 28, and a balance-wheel, 29, a crank-pin, 30, being fixed to the disk 28, said crank-pin being engaged by a pitman, 31, which extends backward and is connected to the frame 14, as best shown in Figs. 2 and 4. The connection between the pitman 31 and the frame 14 is such that the parts may be readily connected and disconnected, the pitman being provided with a loop, 2, arranged to engage with a bolt, 3, that is carried by a bracket, 4, said bracket being secured to the under side of the plate 17; and after the bolt has been placed within the recess it is held in place by a spring, 5, that is riveted to the under side of the rear end of the pitman. From this construction it will be seen that as the shaft 22 is rotated a reciprocating motion will be imparted to the frame 14, and just at the point of the rearward throw of the knife 19 I arrange a metallic plate, 33, that is carried by a cross-bar, 34, which extends across the upper edge of the trough 10, a second bar, 35, being arranged below the bar 34, and being formed so as to fit closely between the side bars, 16, of the frame 14, this bar 35 serving as a cutting-block for the knives 20.

Upon the top of the trough 10, just in front of the bar 34, I arrange a hopper, 40, and behind this hopper 40 there is a second hopper, 41, the two hoppers being separated by a partition, 42, which may be removed when it is desired to throw the two hoppers into one. In the bottom of the forward end of the hopper 41 there is arranged a screen, 43, and beneath this screen there are two laterally-extending troughs, 44.

When it is desired to cut apples, potatoes, or small roots or vegetables of any kind, the partition 42 is removed and the vegetables placed in the upper part of the hopper 41, and as they roll down over the screen 43 all sand, grit, or dirt will fall into the troughs 44, and not be carried to the knives, which, it will be understood, are reciprocated by imparting a rotary motion to the shaft 22, and as the knives are so reciprocated the roots or vegetables contained in or falling into the hopper 40 will be cut and delivered through a chute, 45, to any proper receptacle placed beneath said chute. When large roots are to be cut they are placed directly within the hopper 40.

Having thus fully described my invention, what I claim as new, and desire to secure by Letters Patent, is—

1. A vegetable or root cutter consisting of a supporting-frame, two hoppers divided by a removable partition, a screen in the bottom of one of the said hoppers, laterally-extending troughs under the hopper provided with the screen, a reciprocating cutter-frame mounted on ways in the frame and provided with horizontal and vertical knives, and mechanism for reciprocating the cutter-frame, substantially as herein shown and described.

2. In a vegetable or root cutter, the combination, with a supporting-frame provided with inwardly-projecting flanges and cutting-blocks 34 and 35, of the frame 14, provided with slotted brackets 15, the horizontal knife 19 on the end block, 18, and the vertical knives 20 on the bottom plate, 17, substantially as herein shown and described.

3. In a vegetable or root cutter, the combination, with a supporting-frame and a reciprocating cutter-frame mounted on ways in the supporting-frame and provided with vertical and horizontal knives, of the shaft 22, the gear-wheel 24 thereon, the shaft 26, below shaft 22, the pinion 25 and disk 28 on shaft 26, and the pitman 31, pivoted to the disk 28 and to the under side of the reciprocating frame, substantially as herein shown and described.

IRA P. CRIBB.

Witnesses:
S. R. DOOLITTLE,
E. H. FRARY.